US010305303B2

United States Patent
Hopper et al.

(10) Patent No.: US 10,305,303 B2
(45) Date of Patent: May 28, 2019

(54) WIRELESS CHARGING RECEPTACLE

(71) Applicant: International Business Machines Corporation, Armonk, NY (US)

(72) Inventors: Jenifer Hopper, Austin, TX (US); Mark A. Peloquin, Austin, TX (US); Steven L. Pratt, Austin, TX (US); Karl M. Rister, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/052,079

(22) Filed: Feb. 24, 2016

(65) Prior Publication Data

US 2016/0172884 A1 Jun. 16, 2016

Related U.S. Application Data

(63) Continuation of application No. 14/551,817, filed on Nov. 24, 2014.

(51) Int. Cl.
 *H02J 7/00* (2006.01)
 *H02J 7/02* (2016.01)
 (Continued)

(52) U.S. Cl.
 CPC .......... *H02J 7/0044* (2013.01); *H02J 7/0027* (2013.01); *H02J 7/0042* (2013.01); *H02J 7/025* (2013.01);
 (Continued)

(58) Field of Classification Search
 CPC .. H02J 7/025; H02J 7/0029; H02J 7/02; H02J 7/04; H02J 7/0044; H02J 7/00; H04B 5/00
 (Continued)

(56) References Cited

U.S. PATENT DOCUMENTS 5,940,502 A * 8/1999 Hirai ................... B60R 11/0241
 379/446
7,211,986 B1 * 5/2007 Flowerdew ............. H02J 7/025
 320/108
(Continued)

FOREIGN PATENT DOCUMENTS

CN 202888915 U 4/2013
WO WO 2008153328 A2 * 12/2008 .......... H01M 2/1077

OTHER PUBLICATIONS

Gaohuasong, Wholesale—The Latest Global the First of the Third Generation Wireless Mobile Car Charger for Iphone4s, Dhgate, http://www.dhgate.com/store/product/the-latest-global-the-first-of-the-third/142797340.html.
(Continued)

*Primary Examiner* — Richard Isla
*Assistant Examiner* — Dung V Bui
(74) *Attorney, Agent, or Firm* — Garg Law Firm, PLLC; Jason Sosa

(57) ABSTRACT

A method for a wireless charging receptacle is provided in the illustrative embodiments. An enclosure having a shape and a plurality of sides is formed to at least partially enclose a device while charging a rechargeable power source in the device. An opening is formed in the enclosure. the opening is located on a first side from the plurality of sides. The first side has a surface area less than a second surface area of a second side in the plurality of sides, the second surface area being largest of all surface areas of all sides in the plurality of sides. A wireless charging mechanism is configured relative to at least one of (i) the second side and (ii) a third side of the enclosure, wherein the wireless charging mechanism wirelessly supplies energy to a second wireless charging mechanism coupled with the device.

6 Claims, 16 Drawing Sheets

(51) Int. Cl.
*H02J 7/04* (2006.01)
*H04B 5/00* (2006.01)
*H02J 50/10* (2016.01)

(52) U.S. Cl.
CPC ............... *H02J 7/04* (2013.01); *H02J 50/10* (2016.02); *H04B 5/0037* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 7,899,494 | B2* | 3/2011 | Lee | H01M 10/48 |
| | | | | 455/557 |
| 7,956,577 | B2* | 6/2011 | Fujii | H02J 7/0044 |
| | | | | 320/114 |
| 7,974,095 | B2* | 7/2011 | Murata | H01M 2/1077 |
| | | | | 165/80.4 |
| 8,298,698 | B2* | 10/2012 | Chung | H01M 2/1077 |
| | | | | 429/120 |
| 8,748,027 | B2* | 6/2014 | Im | H01M 2/1077 |
| | | | | 429/120 |
| 2009/0113901 | A1* | 5/2009 | Carrubba | B60H 1/00585 |
| | | | | 62/77 |
| 2010/0055547 | A1* | 3/2010 | Nakamura | H01M 10/044 |
| | | | | 429/71 |
| 2011/0274958 | A1* | 11/2011 | Iritani | H01M 10/6551 |
| | | | | 429/120 |
| 2012/0013295 | A1* | 1/2012 | Yeh | H02J 7/025 |
| | | | | 320/108 |
| 2012/0223595 | A1* | 9/2012 | Oodachi | H02J 5/005 |
| | | | | 307/104 |
| 2012/0308904 | A1* | 12/2012 | Zhang | H01M 8/04141 |
| | | | | 429/413 |
| 2013/0093386 | A1 | 4/2013 | Tsai et al. | |
| 2013/0300204 | A1* | 11/2013 | Partovi | H01F 38/14 |
| | | | | 307/104 |
| 2014/0191717 | A1* | 7/2014 | Hong | H02J 5/005 |
| | | | | 320/108 |
| 2014/0227570 | A1* | 8/2014 | Hoshi | H01M 2/1077 |
| | | | | 429/90 |
| 2016/0172884 | A1* | 6/2016 | Hopper | H02J 7/025 |
| | | | | 29/825 |

OTHER PUBLICATIONS

Tofel, 2013 Toyota Avalon jump-starts wireless phone charging in cars, http://gigaom.com/2012/12/20/2013-toyota-avalon-jump-starts-wireless-phone-charging-in-cars/, Dec. 20, 2012.

Jeep, 2014 Jeep Cherokee—Interior Features of a Full Sized SUV, http://www.jeep.com/en/2014/cherokee/interior/, 2014.

* cited by examiner

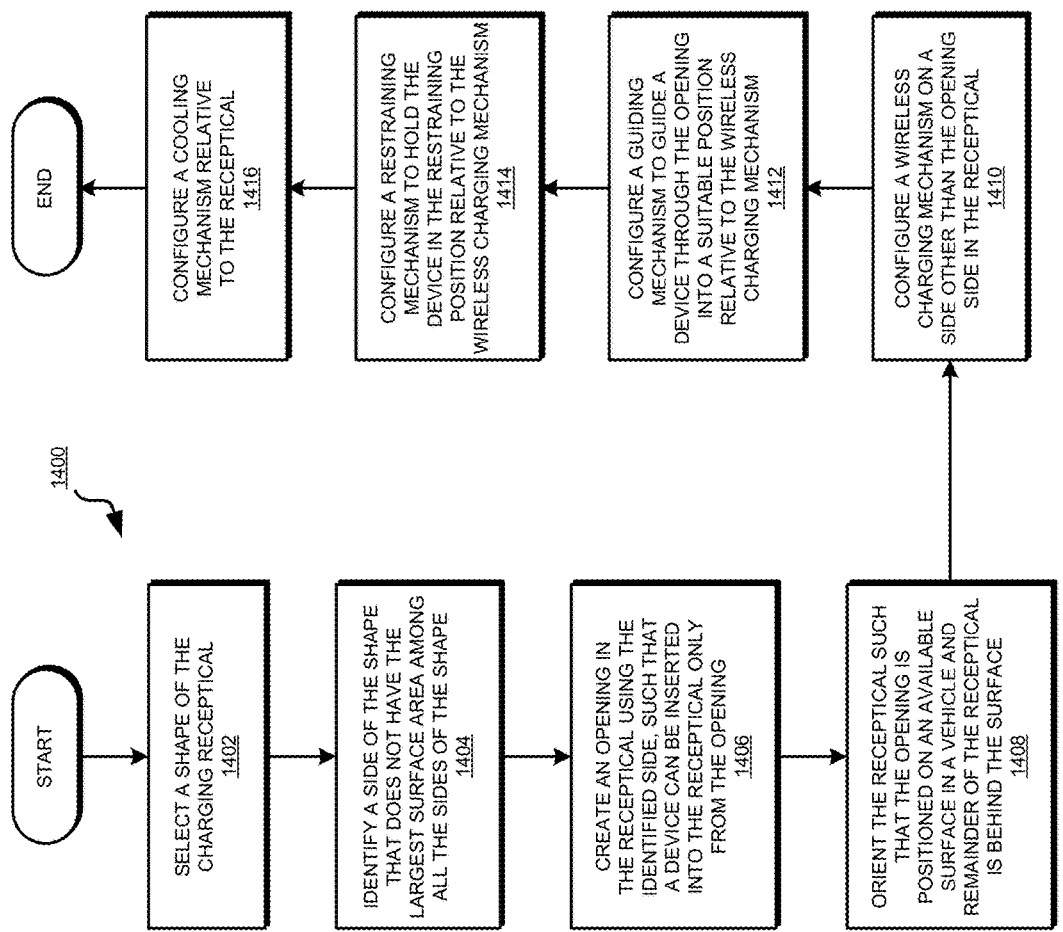

WIRELESS CHARGING RECEPTACLE

TECHNICAL FIELD

The present invention relates generally to a method for wirelessly charging a portable device. More particularly, the present invention relates to a method for a wireless charging receptacle.

BACKGROUND

Portable devices, such as mobile phones, navigation units, tablet computers, wearable devices, and the like, include a rechargeable power source. These rechargeable power sources have to be charged or recharged from time to time.

Users often charge their portable devices while in a vehicle. For example, most users carry a wired charger for their smartphones in their vehicles. Such chargers are configured to couple to a vehicular power source, such as a charging port in the vehicle, and charge the connected portable device over a wire.

Wireless charging is a process of charging a rechargeable power source without using a wire to connect the portable device to a power source. As one example, a presently available wireless charging mechanism employs the induction method for supplying electrical power for charging a portable device. Such wireless charging mechanisms are available for in-vehicle use as well.

For example, a mat, pad, or a similarly configured substantially flat unenclosed surface (collectively referred to hereinafter as a "mat", or a "mat-type" or "mat like" wireless charging mechanism) includes an induction coil, which is connected to a vehicular power source. A portable device is configured with a second induction coil. The second induction coil is configured to receive electromagnetic energy from the induction coil in the mat when the second coil is placed upon the mat, bringing the second coil within a prescribed distance from the coil that is connected to the vehicular power source.

SUMMARY

The illustrative embodiments provide a method for wireless charging receptacle.

An embodiment includes a method for forming a wireless charging receptacle apparatus. The embodiment forms an enclosure having a shape and a plurality of sides to at least partially enclose a device while charging a rechargeable power source in the device. The embodiment forms an opening in the enclosure, wherein the opening is located on a first side from the plurality of sides, wherein the first side has a surface area less than a second surface area of a second side in the plurality of sides, the second surface area being largest of all surface areas of all sides in the plurality of sides. The embodiment configures a wireless charging mechanism relative to at least one of (i) the second side and (ii) a third side of the enclosure, wherein the wireless charging mechanism wirelessly supplies energy to a second wireless charging mechanism coupled with the device.

Another embodiment includes an article of manufacture which, when operated, causes a machine to carry out steps of a method for forming a wireless charging receptacle apparatus. The method includes forming an enclosure having a shape and a plurality of sides to at least partially enclose a device while charging a rechargeable power source in the device. The method further includes forming an opening in the enclosure, wherein the opening is located on a first side from the plurality of sides, wherein the first side has a surface area less than a second surface area of a second side in the plurality of sides, the second surface area being largest of all surface areas of all sides in the plurality of sides. The method further includes configuring a wireless charging mechanism relative to at least one of (i) the second side and (ii) a third side of the enclosure, wherein the wireless charging mechanism wirelessly supplies energy to a second wireless charging mechanism coupled with the device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 14 depicts a flowchart of an example process to configure a wireless charging receptacle in accordance with an illustrative embodiment.

DETAILED DESCRIPTION

Figure 1:
FIG. 1 depicts a picture of a prior-art wireless charging mechanism in a vehicular environment, which can be improved using an illustrative embodiment.

The illustrative embodiments recognize that the presently available mat-type wireless charging mechanism is unsuitable for use in a vehicle. For example, because such mats are essentially unenclosed, and a portable device (hereinafter referred to as simply "device") is not fastened to the mat in any significant manner other than the friction of the surface contact between a surface of the device and a surface of the mat, the device is essentially free to move relative to the mat.

Particularly, when the vehicle is in motion, accelerating or decelerating, the device has a tendency to move away from the mat in an unrestrained manner. The illustrative embodiments recognize that such movements of the device can not only impede the wireless charging of the rechargeable power source in the device, but also create hazardous conditions within the vehicle from the unrestrained movement of the device.

Furthermore, the illustrative embodiments recognize that a mat-type wireless charging mechanism also occupies a significant amount of surface area. The illustrative embodiments recognize that within a vehicle, surfaces suitable for a mat-type wireless charging mechanism are usually unavailable, and are scarce at best. Despite their shortcomings as recognized herein, some automotive manufacturers have started provisioning a mat-type wireless charging mechanism or have started creating the amount of flat area required by the mat.

The illustrative embodiments recognize that the mat or an area designated for a mat is a significant fraction of the total area of the panel, console, or dashboard-top. Furthermore, such provisioning still does not mitigate the risks from the device being set into unrestrained motion due to the maneuvering of the vehicle. Additionally, even if designed onto a surface of a panel, console, or dashboard-top, the mat and the device placed thereupon are incongruent with the aesthetics of the vehicle's interior design.

The illustrative embodiments used to describe the invention generally address and solve the above-described problems and other problems related to wireless charging mechanisms in a vehicle. The illustrative embodiments provide a method for a wireless charging receptacle.

An embodiment configures a wireless charging mechanism in the form of an enclosure with an opening, where a device can be inserted into the enclosure through the opening, and a wireless charging mechanism is configured relative to a surface within the enclosure. Such an enclosure is referred to hereinafter as a wireless charging receptacle.

Another embodiment further configures the receptacle into a variety of shapes. A shape of the receptacle is configured such that the receptacle is suited for use with a type of device. For example, most smartphones today are generally rectangular with some thickness. Accordingly, a receptacle for a present-day smartphone is a cuboid with an opening configured on a side that is not the side with the largest surface area in that cuboid.

For example, suppose that the device has a length L, a width W, and a height H. H is the thickness of the device and a screen or other user interface is arranged on a side of the device formed by the rectangular area L×W. In one embodiment, the opening is sized such that the smartphone would be inserted into the receptacle by positioning into the opening a side of the device that corresponds to the rectangular area W×H. In another embodiment, the opening is sized such that the smartphone would be inserted into the receptacle by positioning into the opening a side of the device that corresponds to the rectangular area L×H. A surface of the receptacle past the opening is configured with a wireless charging mechanism to suitably interface with a wireless charging mechanism located in the device to charge the device's rechargeable power source.

As another example, presently available tablet computers are also generally rectangular with some thickness. Again, suppose that the tablet has a length L1, a width W1, and a height H1. H1 is the thickness of the device and a screen or other user interface is arranged on a side of the device formed by the rectangular area L1×W1. In one embodiment, the opening is sized such that the tablet would be inserted into the receptacle by positioning into the opening a side of the device that corresponds to the rectangular area W1×H1. In another embodiment, the opening is sized such that the tablet would be inserted into the receptacle by positioning into the opening a side of the device that corresponds to the rectangular area L1×H1. A surface of the receptacle past the opening is configured with a wireless charging mechanism to suitably interface with a wireless charging mechanism located in the device to charge the device's rechargeable power source.

As another example, presently available wearable devices are shaped in the form-factor of a wrist watch or eyeglasses. Accordingly, such devices do not conform to generally cuboid shapes. An embodiment configures a receptacle conforming to the shape of a given device such that the opening is sized such that the device would be inserted into the receptacle by positioning into the opening a side of the device that is not the side with the largest surface area. A surface of the receptacle past the opening is configured with a wireless charging mechanism to suitably interface with a wireless charging mechanism located in the device to charge the device's rechargeable power source.

For example, if the wearable device were a wrist-wearable watch-type device, the dial-side of the watch and the side facing the wrist are two of the largest surface area sides on the device. The surface where the crown of a watch is typically located is a side with a surface area smaller than the dial side or the wrist side. According to one embodiment, the receptacle includes a circular or arc-shaped groove or opening within which the crown side or the side opposite the crown side of watch-type device can be inserted. A surface of the receptacle past the opening is configured with a wireless charging mechanism to suitably interface with a wireless charging mechanism located in the device to charge the device's rechargeable power source.

Similarly, for an eyewear-type portable device, the lens-side typically has the largest area and the temple-side has a smaller area than the lenses. According to one embodiment, the receptacle includes a suitably shaped opening to allow a temple of the eyewear-type device to be inserted therethrough. A surface of the receptacle past the opening is configured with a wireless charging mechanism to suitably interface with a wireless charging mechanism located in the device to charge the device's rechargeable power source.

An embodiment further configures a receptacle to receive a plurality of devices and wirelessly charge their respective rechargeable power sources. An example receptacle according to such an embodiment is configured to accept two or more smartphones or other portable devices for charging. Furthermore, each device may be inserted in a designated location in the receptacle, or may be inserted in any available position within the receptacle.

For example, if the receptacle has two slots for two smartphones and is situated in the console between a driver and a passenger in an automobile, one slot may be designated for the driver's smartphone and another for the passenger's smartphone. Designating a receptacle for a particular device is useful when other functions in addition to the recharging functions are provisioned in the receptacle, e.g., when a receptacle can wirelessly communicate with the device placed therein for data exchange.

Another embodiment configures the receptacle in such a manner that the device can be oriented in any manner within the receptacle. For example, one receptacle includes a wireless charging mechanism on only one surface of the receptacle, requiring the device to be oriented such that the wireless charging mechanism on the device is closest to the wireless charging mechanism of the receptacle. Another receptacle includes wireless charging mechanisms in more than one surface of the receptacle, allowing the device to be oriented in multiple ways within the receptacle such that each such orientation of the device within the receptacle places the wireless charging mechanism of the device closest to at least one wireless charging mechanism of the receptacle.

Another embodiment configures a receptacle with one or more guiding mechanism to guide a device into a suitable position within the receptacle. Another embodiment configures a receptacle with one or more restraining or securing mechanism to restrain a device in the position within the receptacle. Another embodiment configures a receptacle with one or more cooling mechanism to cool the device while the device charges within the receptacle.

A method of an embodiment described herein, when implemented in an apparatus, comprises substantial advancement of the functionality of that apparatus for wirelessly charging a rechargeable power source of a portable device. For example, in order to wirelessly charge a portable device, the prior-art requires uses a mat-type surface, and a device has to be placed in contact with that mat-type unenclosed surface. In contrast, an embodiment provides a substantially enclosed receptacle with an opening through which the device can be inserted into the receptacle. The manner of inserting the device into the receptacle positions the device relative to a wireless charging mechanism in the receptacle for charging the power source of the device. Operating in a manner described herein, an embodiment secures the device during the wireless charging, while keeping the device significantly more restrained than the prior-art, and while interfering with the surrounding environment to a lesser degree than the prior-art. Such manner of wireless charging is unavailable in presently available wireless charging mechanism for vehicular environments. Thus, a substantial advancement of such apparatus by using a method of an embodiment improves the space utilization, improves the restraining of the devices being charged, and minimizes the interference with the aesthetics of the surrounding environment, for wireless charging of portable devices.

The illustrative embodiments are described with respect to certain shapes, sizes, orientations, placements, configured for certain portable devices, restraining or securing mechanisms, guiding mechanisms, cooling mechanisms, only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Additional operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to FIG. 1, this figure depicts a picture of a prior-art wireless charging mechanism in a vehicular environment, which can be improved using an illustrative embodiment. Mat 102 provides a wireless charging mechanism to charge device 104 that is shown placed upon mat 102. Mat 102 is shown configured or positioned on center console 106 in a vehicle. As can be seen from the picture in FIG. 1, mat 102 occupies a significant surface area of console 106, where flat surfaces are scarce by design. As can also be seen from the picture in FIG. 1, device 104 is free to move on mat 102 and even leave the surface of mat 102 during certain maneuvers of the vehicle, creating a hazardous condition. As can also be seen from the picture in FIG. 1, mat 102 and device 104 placed thereupon are distracting to the driver of the vehicle, and can also interfere with the aesthetics and operation of the vehicle.

Figure 2A:
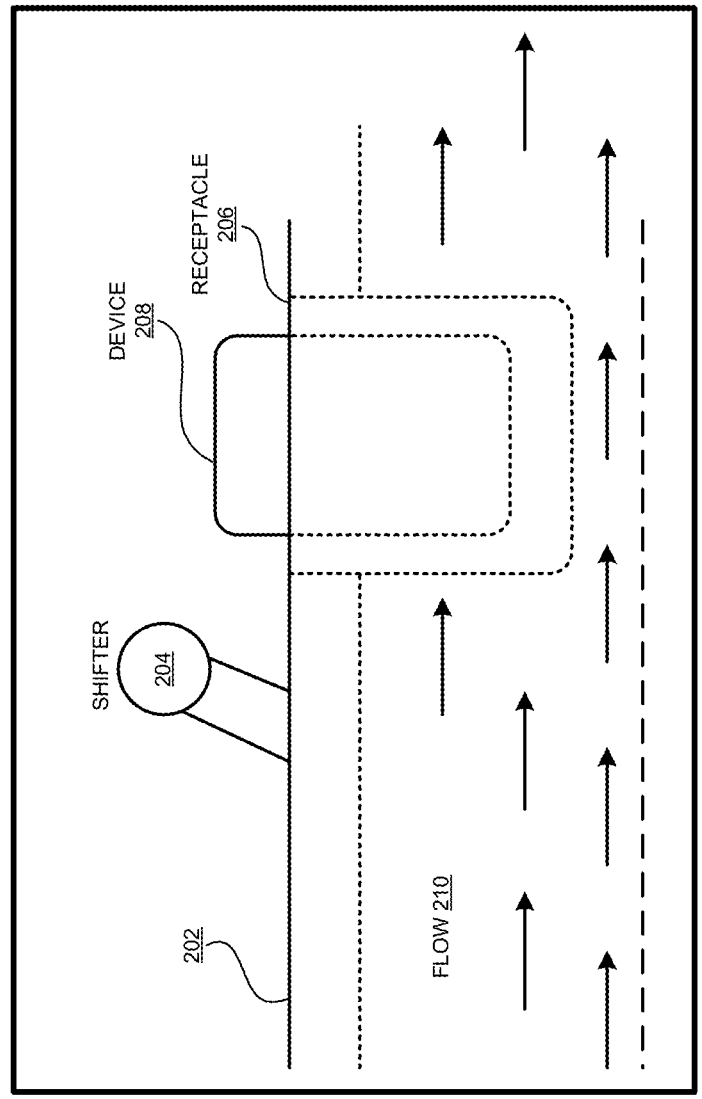
FIG. 2A depicts a block diagram of a side view of an example configuration of a wireless charging receptacle in a vehicle in accordance with an illustrative embodiment.

With reference to FIG. 2A, this figure depicts a block diagram of a side view of an example configuration of a wireless charging receptacle in a vehicle in accordance with an illustrative embodiment. Console 202 is similar to console 106 in FIG. 1. Shifter 204 is an example equipment typically present on console 202.

Receptacle 206 is a slot-like formation built into console 202. The dotted lines of receptacle 206 illustrate the portion of receptacle that may be hidden or obscured by the material of console 202.

Device 208 is depicted using solid and dotted lines for a similar purpose to illustrate observable and obscured portions of device 208. Device 208 is positioned in receptacle 206 such that a surface of device 208 that is within receptacle 206 can receive electrical power from a wireless charging mechanism of receptacle 206.

Charging device 208 generates heat within receptacle 206. Such heat can be detrimental to device 208, receptacle 206, other parts in console 202, or some combination thereof. Flow 210 is a flow of a cooling medium, for example a suitable fluid, directed to extract heat from receptacle 206 or a general vicinity thereof. Only as an example, the cooling mechanism is depicted as flow 210 of air. Other fluids, including but not limited to a refrigerated fluid, is similarly usable in flow 210 within the scope of the illustrative embodiments.

The direction of flow 210 is only a non-limiting example, and flow 210 may occur in any suitable direction relative to receptacle 206 within the scope of the illustrative embodiments. Furthermore, flow 210 may pass through receptacle 206 via vents, tubes, or louvers (not shown) built into receptacle 206.

Figure 2B:
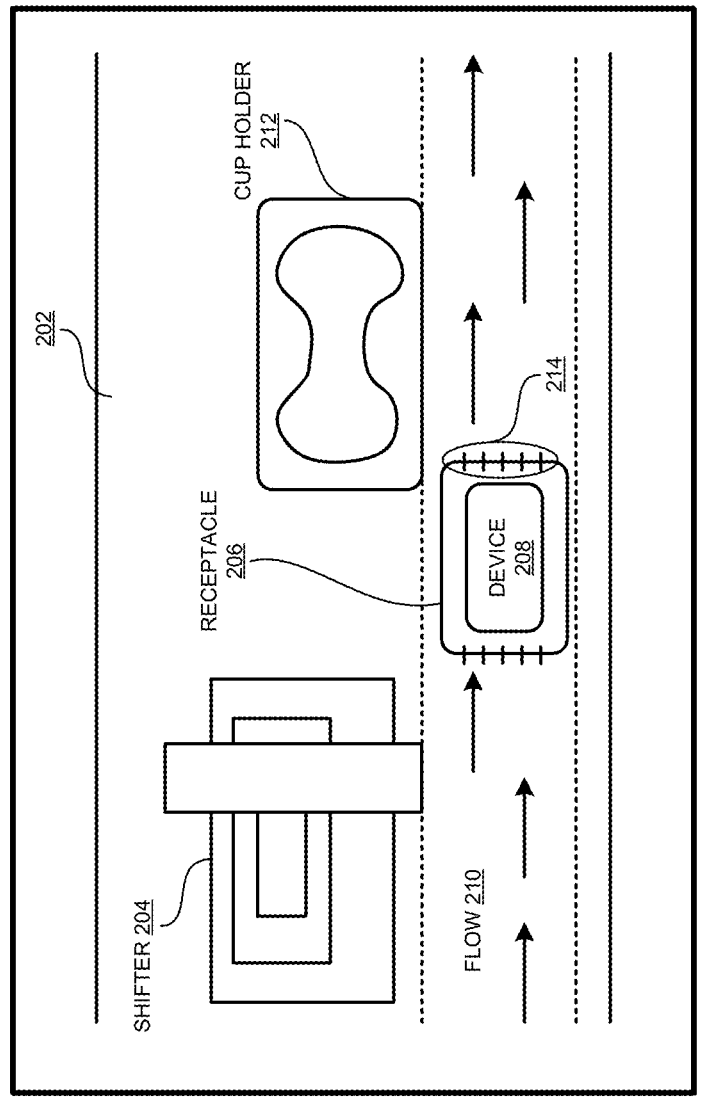
FIG. 2B depicts a block diagram of a top view of an example configuration of a wireless charging receptacle in a vehicle in accordance with an illustrative embodiment.

With reference to FIG. 2B, this figure depicts a block diagram of a top view of an example configuration of a wireless charging receptacle in a vehicle in accordance with an illustrative embodiment. Console 202, shifter 204, receptacle 206, and device 208 are the same artifacts as depicted in FIG. 2A. Cup holder 212 is a recess typically found on console 202 for holding certain objects, such as a cup or coins.

The top view in FIG. 2B shows an example placement of device 208 relative to receptacle 206 for wireless charging. Vents 214 are depicted in this figure to show that flow 210 can pass through receptacle 206 to provide the cooling described above. FIGS. 2A and 2B are depicted using substantially rectangular device 208 and substantially rectangular receptacle 206 only as non-limiting examples. Other shapes of both are contemplated within the scope of the illustrative embodiments as described elsewhere in this disclosure. Furthermore, the placement of receptacle 206 on console 202 is only a non-limiting example placement. Receptacle 206 can be placed in other locations, such as in a vehicle door, in a vehicle dashboard, or in another component of a vehicle within the scope of the illustrative embodiments.

Figure 3:
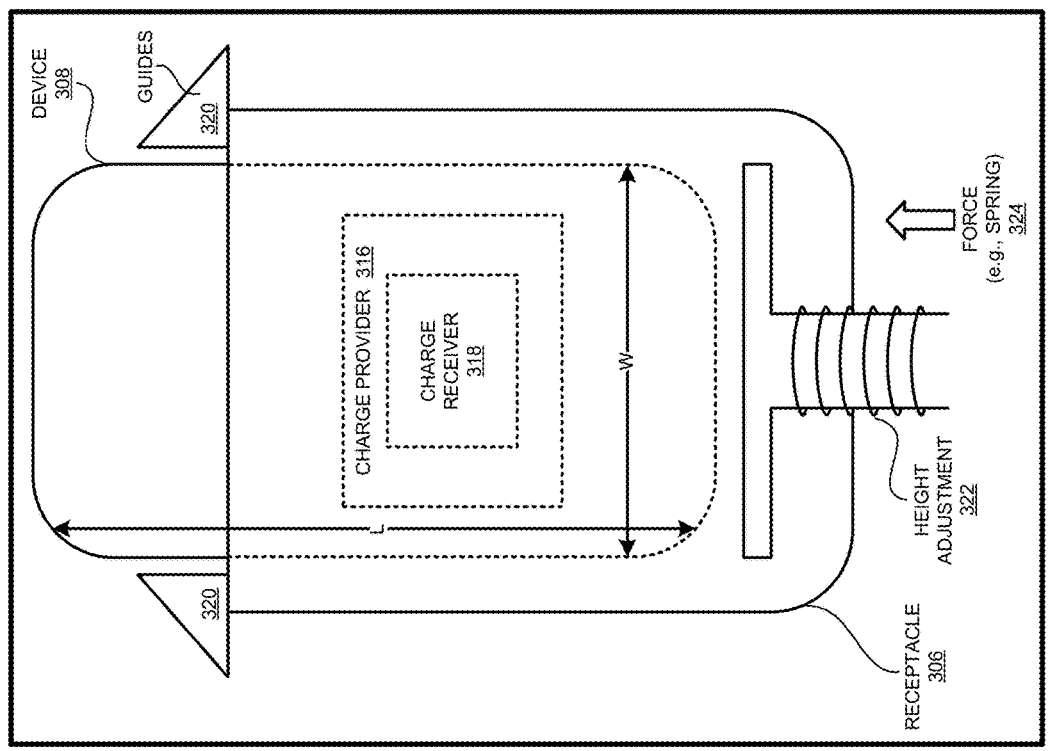
FIG. 3 depicts a block diagram of a side view of an example configuration of a wireless charging receptacle in accordance with an illustrative embodiment.

With reference to FIG. 3, this figure depicts a block diagram of a side view of an example configuration of a wireless charging receptacle in accordance with an illustrative embodiment. Receptacle 306 is similar to receptacle 206 in FIG. 2B. Device 308 is similar to device 208 in FIG. 2B.

Charge provider 316 is a wireless charging mechanism configured in receptacle 306 to wirelessly provide charging energy to charge receiver 318 in device 308. Change receiver 318 is a wireless charging mechanism configured in device 308 to wirelessly receive charging energy from charge provider 316 in receptacle 306.

Different devices are of different sizes and widths. Accordingly, to position charge provider 316 and charge receiver 318 in a suitable position relative to one another may require adjusting a horizontal position of device 308 relative to the opening (not shown) in receptacle 306. An example suitable position is when charge provider 316 and charge receiver 318 are proximate to each other by less than a threshold distance, when device 308 is situated at least partially within receptacle 306. The threshold distance is implementation-specific and depends at least upon the range and power setting of charge provider 316, charge receiver 318, or both, in a given implementation.

Guides 320 include one or more optional guiding mechanisms configured to guide device 308 into receptacle 306 in a suitable position. In the depicted example, guides 320 comprise two protrusions outside receptacle 306. In another embodiment, guide 320 may be a combination of protrusions or indentations outside receptacle 306, such as in the form of a static or adjustable tab, bump, rail, notch, groove, or other suitable protrusion or indentation.

Similarly, in another embodiment, guide 320 may be a single protrusion or indentation outside receptacle 306. In another embodiment, guide 320 may be a single protrusion or indentation inside receptacle 306. In another embodiment, guide 320 may be multiple protrusions or indentations inside receptacle 306. In another embodiment, guide 320 may be a combination of protrusions or indentations inside and outside receptacle 306.

Different devices are of different sizes and heights. Accordingly, to position charge provider 316 and charge receiver 318 in a suitable position relative to one another as described elsewhere, may require adjusting a depth to which device 308 reaches inside receptacle 306.

Height adjustment mechanism 322 is another optional mechanism configured to guide device 308 into receptacle 306 in a suitable position. Force 324 applied by height adjustment mechanism 322 from within receptacle 306 along the length (L) of device 308 restricts the depth to which device 308 reaches in receptacle 306. In one example embodiment, mechanism 322 employs a spring to provide force 324.

Within the scope of the illustrative embodiments, mechanism 322 may also be configured to assist in removal of device 308 from receptacle 306. For example, a latch (not shown) in mechanism 322 may be configured to lock mechanism 322 in a certain position when device 308 is occupying receptacle 306. The latch may be disengaged, such as by pressing on device 308, causing force 324 to boost device 308 sufficiently out of receptacle 306 so that device 308 may be retrieved from receptacle 306.

Figure 4:
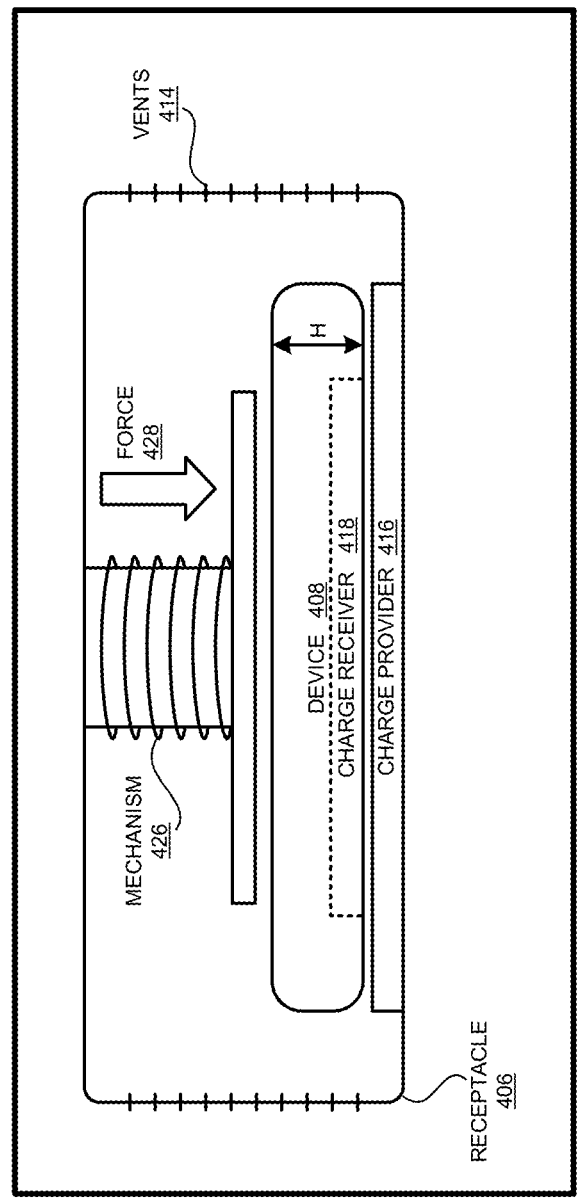
FIG. 4 depicts a block diagram of a top view of an example configuration of a wireless charging receptacle in accordance with an illustrative embodiment.

With reference to FIG. 4, this figure depicts a block diagram of a top view of an example configuration of a wireless charging receptacle in accordance with an illustrative embodiment. Receptacle 406 is similar to receptacle 206 in FIG. 2B. Device 408 is similar to device 208 in FIG. 2B. In one example embodiment, receptacle 406 provides an improvement of receptacle 306 in FIG. 3.

Charge provider 416 and charge receiver 418 are similar to change provider 316 and charge receiver 318, respectively, in FIG. 3. Vents 414 are similar to vents 214 in FIG. 2B.

Different devices are of different sizes and thicknesses. Accordingly, to position charge provider 416 and charge receiver 418 in a suitable position relative to one another may require adjusting a position of device 408 relative to charge provider 416 in receptacle 406 or causing device 408 to stay in that suitable position.

Mechanism 426 is an optional mechanism that provides guidance for adjusting the position of device 408 relative to charge provider 416, holding device 408 in a position relative to charge provider 416, or both. Mechanism 426 can be implemented in any suitable manner for a similar purpose, without being limited to the illustrative example depicted in FIG. 4.

Force 428 applied by mechanism 426 from within receptacle 406 along the thickness (H) of device 408 adjusts the position of device 408 relative to charge provider 416, holds device 408 in a position relative to charge provider 416, or both. In one example embodiment, mechanism 426 employs a spring to provide force 428.

Within the scope of the illustrative embodiments, mechanism 426 may also be configured to engage automatically upon the placement of device 408 at least partially in receptacle 406. For example, mechanism 426 may apply force 428 responsive to device 408 making contact with height adjustment mechanism 322 in FIG. 3.

Figure 5:
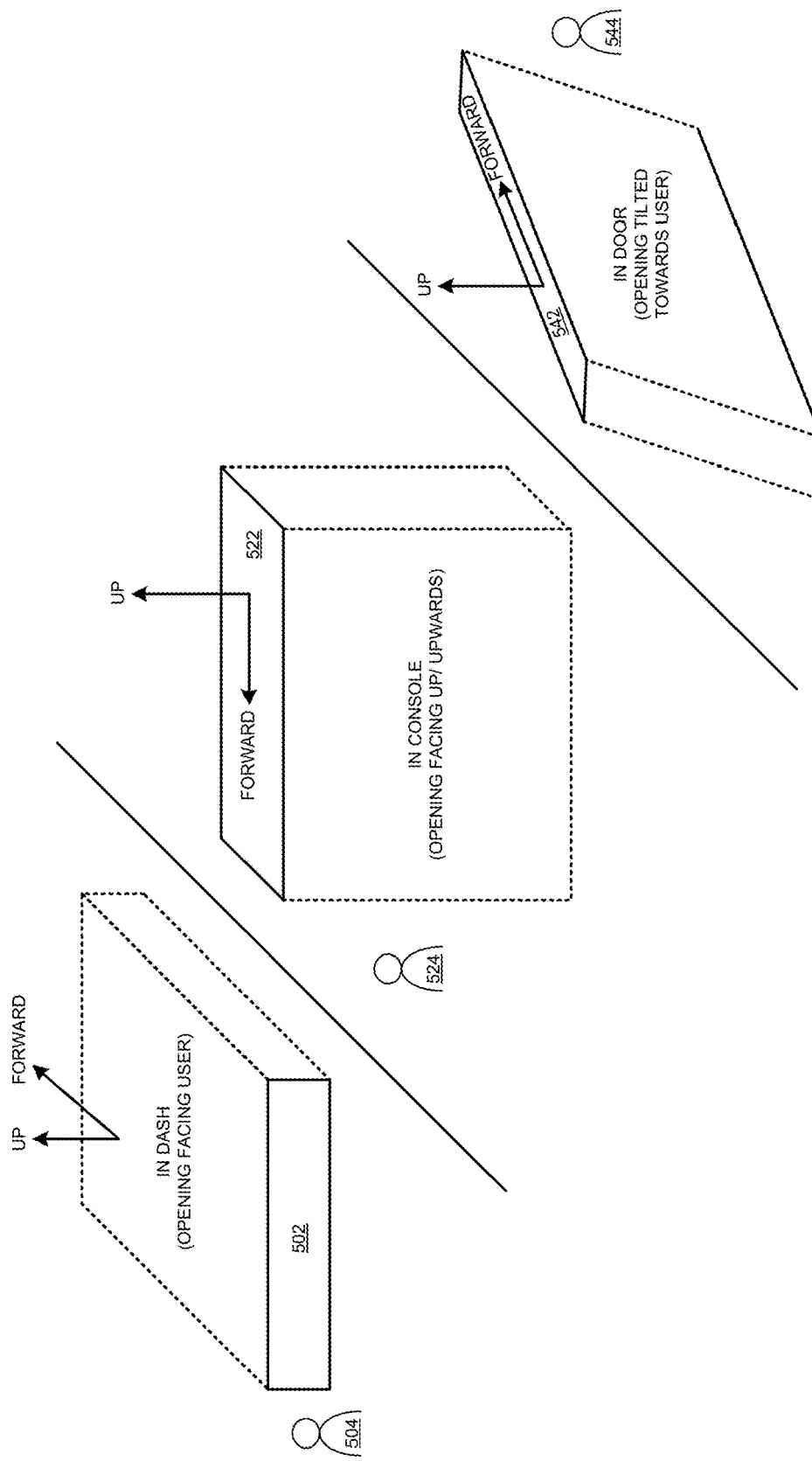
FIG. 5 depicts a block diagram of some example locations and orientations of a wireless charging receptacle in accordance with an illustrative embodiment.

With reference to FIG. 5, this figure depicts a block diagram of some example locations and orientations of a wireless charging receptacle in accordance with an illustrative embodiment. Receptacle 502 is an example of receptacle 206, 306, or 406 in FIGS. 2B, 3, and 4, respectively.

In one example orientation, such as when mounted in a dashboard of a vehicle, which a user faces to operate the vehicle, the receptacle is oriented such that opening 502 substantially faces user 504. This orientation is also possible using a substantially vertical surface facing passengers seated in the rear seat in the cabin of the vehicle. In this orientation, the "up" direction from the point-of-view of user 504 is substantially aligned with a plane of opening 502, e.g., within 45 degrees to 135 degrees of the plane of opening 502. In this orientation, the "forward" direction from the point-of-view of user 504 is a forward direction of travel of the vehicle.

In another example orientation, such as when mounted in console 202 in FIG. 2 of a vehicle, which is adjacent to a user when the user is seated to operate the vehicle, the receptacle is oriented such that a plane of opening 522 is substantially horizontal with respect to user 524. This orientation is also possible using a substantially horizontal surface between passengers seated in the rear seat in the cabin of the vehicle. In this orientation, the "up" direction from the point-of-view of user 524 is substantially perpendicular to a plane of opening 522, e.g., within 45 degrees to 135 degrees of the plane of opening 522. In this orientation, the "forward" direction from the point-of-view of user 524 is a forward direction of travel of the vehicle.

In another example orientation, such as when mounted in a door of a vehicle, which is adjacent to a user in an opposite direction from console 202 when the user is seated to operate the vehicle, the receptacle is oriented such that opening 542 is substantially perpendicular to the plane of the door or side panel. This orientation is also possible using a substantially vertical surface adjacent to passengers seated in the rear seat in the cabin of the vehicle, such as a rear door or a side panel of the vehicle. In this orientation, the "up" direction from the point-of-view of user 544 is substantially perpendicular to a plane of opening 542, e.g., within −45 degrees to +45 degrees of the user's up direction. In this orientation, the "forward" direction from the point-of-view of user 544 is a forward direction of travel of the vehicle.

These example orientations are not intended to be limiting on the illustrative embodiments. From this disclosure, those of ordinary skill in the art will be able to conceive many other locations and orientations of a wireless charging receptacle of an embodiment, and the same are contemplated within the scope of the illustrative embodiments. Some examples of such other locations and orientations include but are not limited to an overhead location or an under-seat location, and substantially horizontal orientation, substantially vertical orientation, or an intermediate angled orientation.

Figure 6:
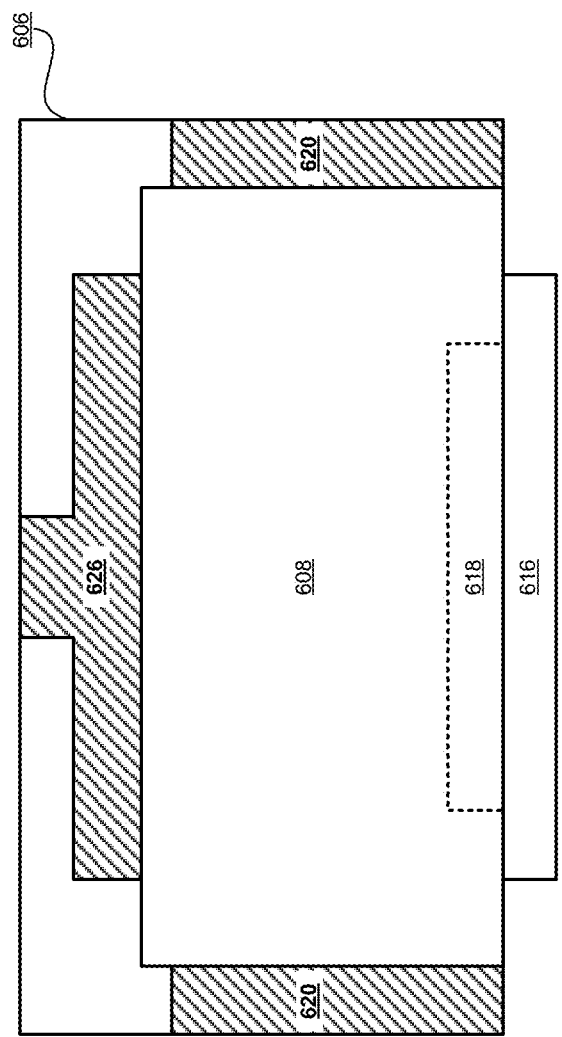
FIG. 6 depicts a block diagram of an example top view of a wireless charging receptacle in accordance with an illustrative embodiment.

With reference to FIG. 6, this figure depicts a block diagram of an example top view of a wireless charging receptacle in accordance with an illustrative embodiment. Receptacle 606 is an example of any receptacle described in FIGS. 2A-5. Device 608 is an example of device 408 in FIG. 4.

The top view of FIG. 6 shows guides 620 and mechanism 626 holding device 608 in a suitable position such that charge provider 616 and charge receiver 618 are proximate to each other by less than a threshold distance, when device 608 is situated at least partially within receptacle 606. Guides 620 are examples of guides 320 in FIG. 3, and mechanism 626 is an example of mechanism 426 in FIG. 4.

Figure 7A:
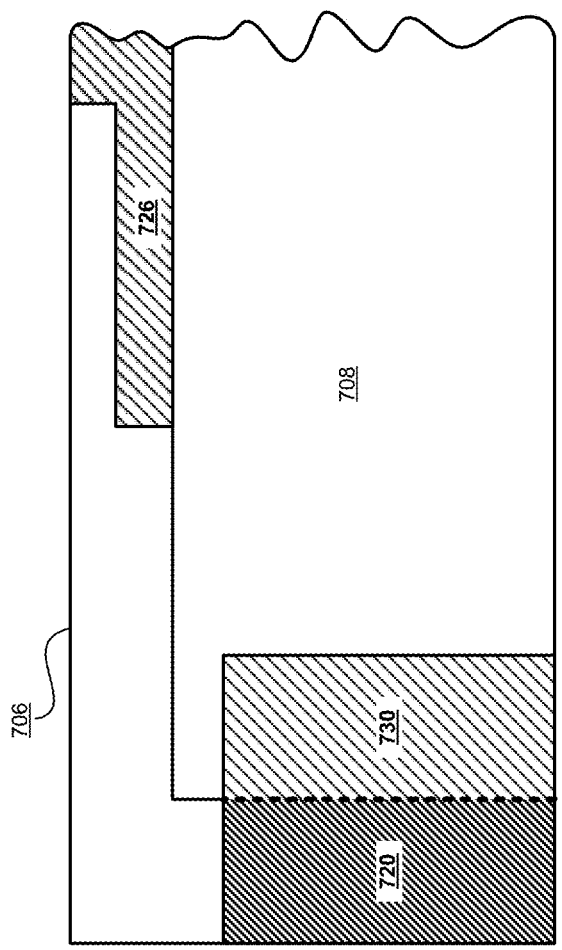
FIG. 7A depicts a block diagram of an example partial top view of a wireless charging receptacle in accordance with an illustrative embodiment.

With reference to FIG. 7A, this figure depicts a block diagram of an example partial top view of a wireless charging receptacle in accordance with an illustrative embodiment. Receptacle 706 is an example of receptacle 606 in FIG. 6. Device 708 is an example of device 608 in FIG. 6. Guide 720 is an example of guides 620 in FIG. 6, and mechanism 726 is an example of mechanism 626 in FIG. 6.

In some embodiments, mechanism 726 may not perform a restraining function, or may restrain device 708 inadequately, such that a risk exists that device 708 may dislodge from receptacle 706. In such cases, or otherwise as a precaution, additional restraining mechanisms may be configured with receptacle 706 according to an embodiment.

The top view of FIG. 7A shows restraining mechanism 730. In one embodiment, mechanism 730, e.g., a tab or similar structure protrudes over device 708, after device 708 has been positioned in receptacle 706, preventing device 708 from dislodging from receptacle 706 unless mechanism 730 is manipulated to no longer protrude over device 708. In one embodiment, mechanism 730 may be integrated with guide 720 or another structure associated with receptacle 706.

Figure 7B:
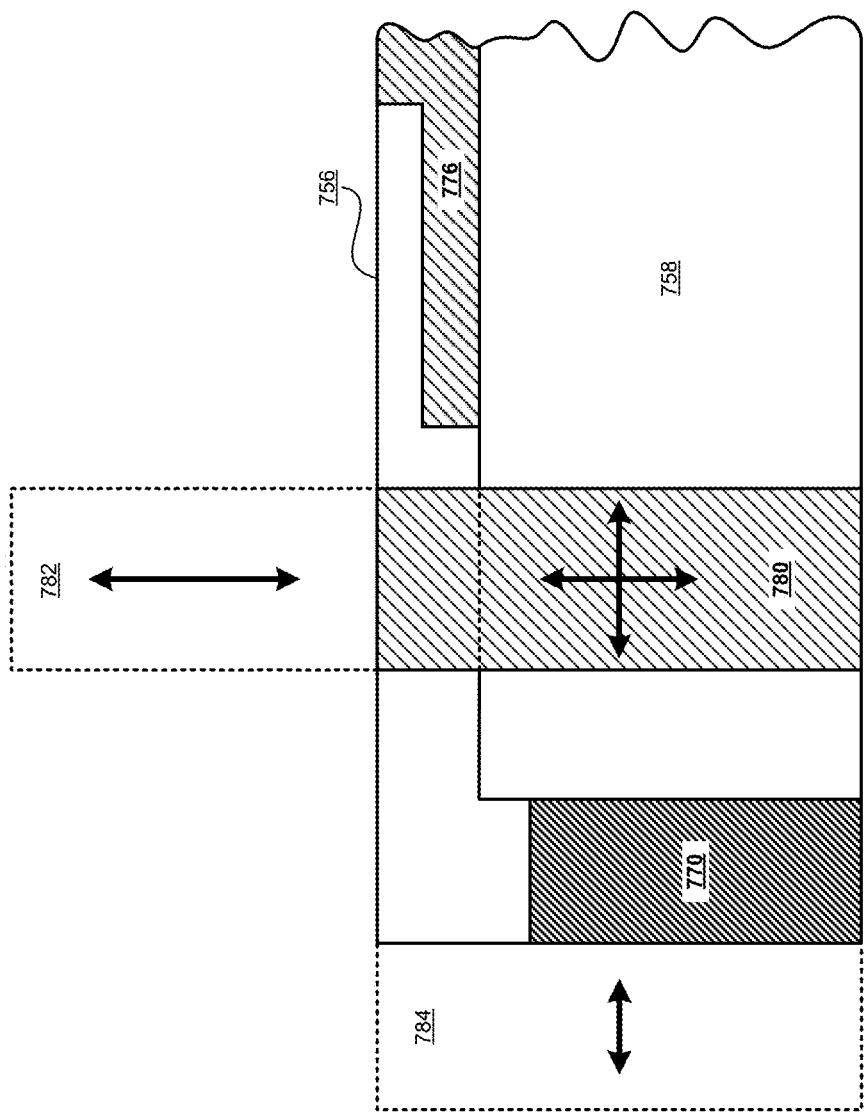
FIG. 7B depicts a block diagram of another example partial top view of a wireless charging receptacle in accordance with an illustrative embodiment.

With reference to FIG. 7B, this figure depicts a block diagram of another example partial top view of a wireless charging receptacle in accordance with an illustrative embodiment. Receptacle 756 is an example of receptacle 706 in FIG. 7A. Device 758 is an example of device 708 in FIG. 7A. Guide 770 is an example of guides 720 in FIG. 7A, and mechanism 776 is an example of mechanism 726 in FIG. 7A.

This figure depicts another example restraining mechanism according to another embodiment, to mitigate the risk of device 758 dislodging from receptacle 756. The top view of FIG. 7B shows restraining mechanism 780. In one embodiment, mechanism 780, e.g., a tab or similar structure is movable over device 758, after device 758 has been positioned in receptacle 756. Mechanism 780 prevents device 758 from dislodging from receptacle 756 unless mechanism 780 is manipulated to move in a first direction and occupy position 782, or is manipulated to move in a second direction and occupy position 784. Once in position 782 or 784, mechanism 780 no longer obstructs the removal of device 758 from receptacle 756. In one embodiment, mechanism 780 may be coupled with a structure associated with receptacle 756.

Figure 8:
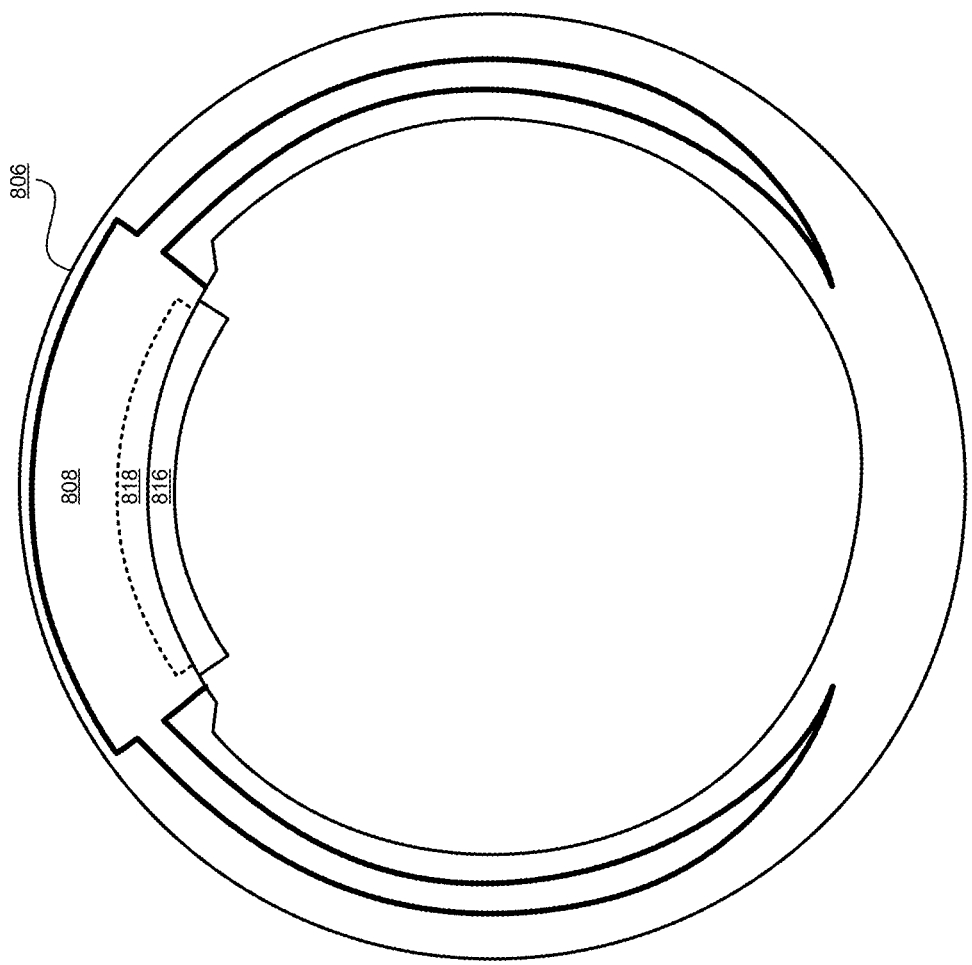
FIG. 8 depicts a block diagram of another example top view of a wireless charging receptacle in accordance with an illustrative embodiment.

With reference to FIG. 8, this figure depicts a block diagram of another example top view of a wireless charging receptacle in accordance with an illustrative embodiment. Device 808 is an example of any device described in FIGS. 2A-7B, but comprises a different form-factor. Particularly, as an illustrative example, device 808 is depicted as a wrist-wearable device. Receptacle 806 is an example of any receptacle described in FIGS. 2A-7B, but comprises a shape or structure suitable for charging device 808.

As depicted, receptacle 806 is circular or arc-shaped to accommodate the shape or form of device 808. Receptacle 806 includes charge provider 816 in a manner similar to charge provider 616 of receptacle 606 in FIG. 6. Device 808 includes charge receiver 818 in a manner similar to charge receiver 618 of device 608 in FIG. 6.

Additionally, receptacle 806 can include additional mechanisms (not shown). For example, receptacle 806 can be configured with one or more guides in the manner of guides 320 in FIG. 3, height adjustment mechanism 322 in FIG. 3, mechanism 426 in FIG. 4, restraining mechanism 730 in FIG. 7A, restraining mechanism 780 in FIG. 7B, or some combination thereof. Any such additional feature can be configured to fit and operate in a manner described elsewhere, when incorporated into the given shape of receptacle 806.

Figure 9:
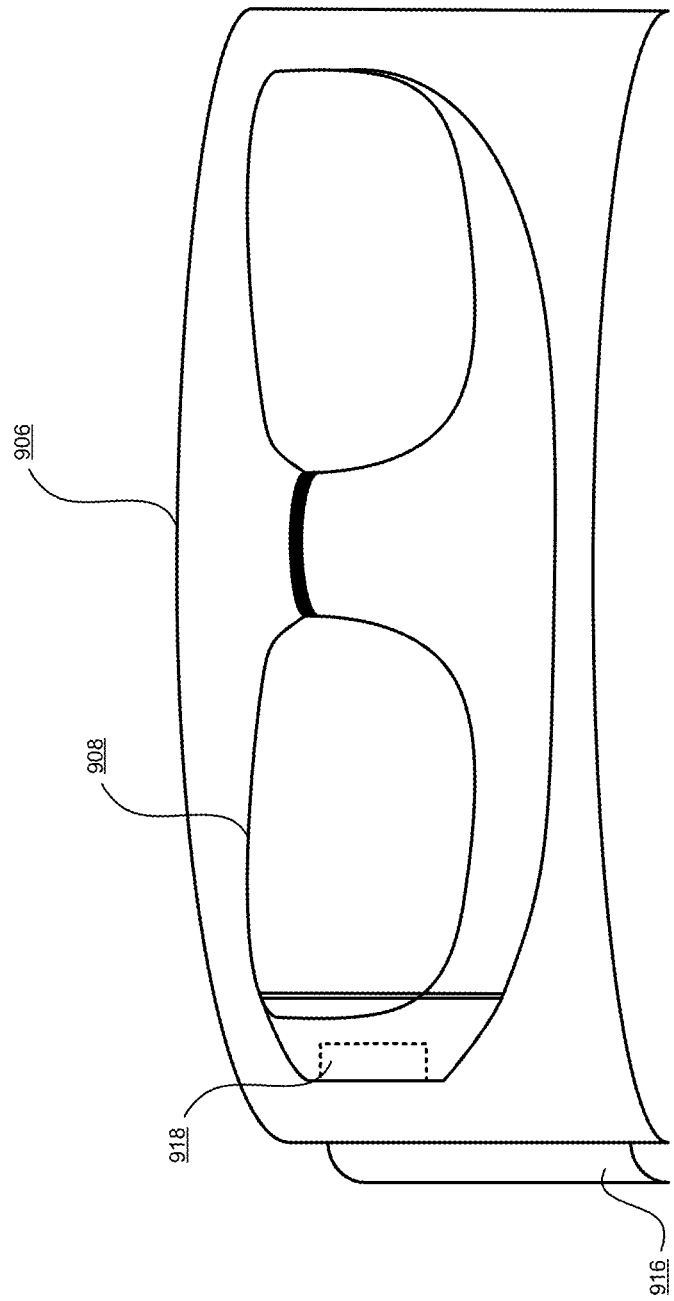
FIG. 9 depicts a block diagram of another example top view of a wireless charging receptacle in accordance with an illustrative embodiment.

With reference to FIG. 9, this figure depicts a block diagram of another example top view of a wireless charging receptacle in accordance with an illustrative embodiment. Device 908 is an example of any device described in FIGS. 2A-8, but comprises a different form-factor. Particularly, as an illustrative example, device 908 is depicted as a eye-wearable device. Receptacle 906 is an example of any receptacle described in FIGS. 2A-8, but comprises a shape or structure suitable for charging device 908.

As depicted, receptacle 906 is shaped to accommodate the shape or form of device 908. Receptacle 906 includes charge provider 916 in a manner similar to charge provider 816 of receptacle 806 in FIG. 8. Device 908 includes charge receiver 918 in a manner similar to charge receiver 818 of device 808 in FIG. 8.

Additionally, receptacle 906 can include additional mechanisms (not shown). For example, receptacle 906 can be configured with one or more guides in the manner of guides 320 in FIG. 3, height adjustment mechanism 322 in FIG. 3, mechanism 426 in FIG. 4, restraining mechanism 730 in FIG. 7A, restraining mechanism 780 in FIG. 7B, or some combination thereof. Any such additional feature can be configured to fit and operate in a manner described elsewhere, when incorporated into the given shape of receptacle 906.

Figure 10:
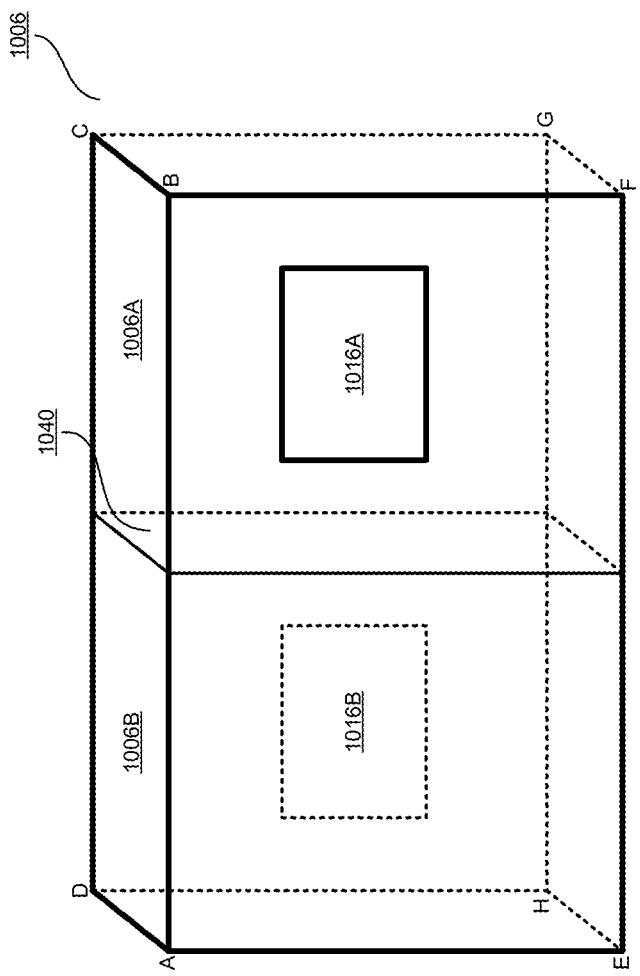
FIG. 10 depicts a block diagram of another example configuration of a wireless charging receptacle in accordance with an illustrative embodiment.

With reference to FIG. 10, this figure depicts a block diagram of another example configuration of a wireless charging receptacle in accordance with an illustrative embodiment. Receptacle 1006 is an example of any receptacle described in FIGS. 2A-9, but is configured to accommodate a plurality of any of the devices described in FIGS. 2A-9, or a combination thereof.

For the clarity of the illustration, the depicted configuration is for two similar devices, such as device 608 in FIG. 6, but the configuration can be adapted to accommodate more than two devices of any kind. For example the depicted configuration can be adapted to accept any number of device 608 of FIG. 6, device 808 of FIG. 8, device 908 in FIG. 9, or a combination thereof.

Partition 1040 separates receptacle 1006A from receptacle 1006B. Partition 1040, need not be solid divider between adjacent receptacles, and can be configured in any suitable manner, including but not limited to a complete or partial obstruction between adjacent receptacles, a movable object configured between adjacent receptacles, or another suitable shape or feature coupled with a structure of receptacle 1006A 1006B or both.

Each receptacle in the plurality has an associated charge provider. For example, charge provider 1016A is associated with receptacle 1006A and provides charging energy to a device placed in receptacle 1006A. Similarly, charge provider 1016B is associated with receptacle 1006B and provides charging energy to a device placed in receptacle 1006B.

Furthermore, as a non-limiting optional feature, a receptacle may be configured to receive a device only when the device is oriented in a particular manner relative to the receptacle. For example, assume that the example devices to be placed in receptacles 1006A and 1006B are smartphones with screens on one side and a charge receiver on the opposite side. For such devices, charge provider 1016A is configured on or relative to surface ABFE, such that a device, when placed in receptacle 1006A will charge only when the device's charge receiver faces surface ABFE and the screen faces surface DCGH. Similarly, charge provider 1016B is configured on or relative to surface DCGH, such that a device, when placed in receptacle 1006B will charge only when the device's charge receiver faces surface DCGH and the screen faces surface ABFE.

Such a configuration is particularly useful when, for example, receptacle 1006 is positioned in console 202 between a driver and a passenger in a vehicle. Assuming that the driver occupies a seat towards surface ABFE and the passenger occupies a seat towards surface DCGH, receptacle 1006B allows the user to have a view of the screen of the driver's device while charging, and receptacle 1006A allows the passenger to have a view of the screen of the passenger's device while charging.

The charge providers have been depicted on certain surfaces only for the clarity of the examples not to imply any limitation on the illustrative embodiments. From this disclosure, those of ordinary skill in the art will be able to configure a combined receptacle for a plurality of devices differently, and such other configurations are contemplated within the scope of the illustrative embodiments.

Figure 11:
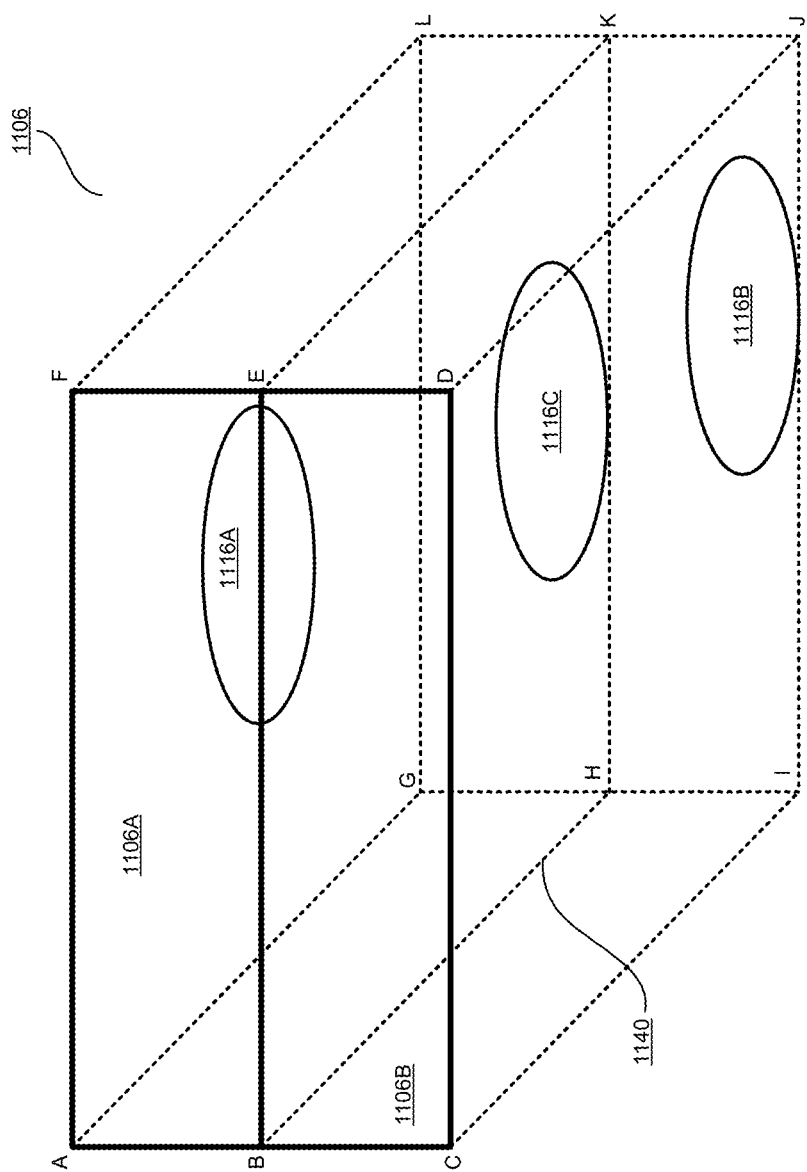
FIG. 11 depicts a block diagram of another example configuration of a wireless charging receptacle in accordance with an illustrative embodiment.

With reference to FIG. 11, this figure depicts a block diagram of another example configuration of a wireless charging receptacle in accordance with an illustrative embodiment. Receptacle 1106 is an example of any receptacle described in FIGS. 2A-10, but is configured to accommodate a plurality of any of the devices described in FIGS. 2A-9, or a combination thereof.

For the clarity of the illustration, the depicted configuration is for two similar devices, such as device 608 in FIG. 6, but the configuration can be adapted to accommodate more than two devices of any kind. For example the depicted configuration can be adapted to accept any number of device 608 of FIG. 6, device 808 of FIG. 8, device 908 in FIG. 9, or a combination thereof.

Partition 1140 separates receptacle 1106A from receptacle 1106B and can be formed in any suitable manner as described with respect to partition 1040 in FIG. 10. Each receptacle in the plurality has associated therewith one or more charge providers. For example, charge provider 1116A is associated with receptacle 1106A and provides charging energy to a device placed in receptacle 1106A. Similarly, charge provider 1116B is associated with receptacle 1106B and provides charging energy to a device placed in receptacle 1106B.

Additional charge providers can be configured as dedicated to a receptacle or shared by a plurality of receptacles. For example, charge provider 1116C is positioned relative to partition 1140 such that a device placed in receptacle 1106A or receptacle 1106B can receive charging energy from charge provider 1116C.

Configured in this manner, a receptacle may be configured to receive a device in a variety of orientations relative to the receptacle. Charge provider 1116A is configured on or relative to surface AGLF. Charge provider 1116B is configured on or relative to surface CIJD. Charge provider 1116C is configured on or relative to surface BHKE.

For example, assume that the example devices to be placed in receptacles 1106A and 1106B are smartphones with screens on one side and a charge receiver on the opposite side. When such a device is placed in receptacle 1106A, that device can be charged from charge provider 1116A when the screen of the device is facing surface BHKE, and charged from charge provider 1116C when the screen of the device is facing surface AGLF. Similarly, when such a device is placed in receptacle 1106B, that device can be charged from charge provider 1116B when the screen of the device is facing surface BHKE, and charged from charge provider 1116C when the screen of the device is facing surface CLJD.

Thus, regardless of how the user orients the device into receptacle 1106A and/or receptacle 1106B, the device will be charged. Such a configuration is particularly useful in reducing the amount of care a user has to take in positioning a device for charging, such as in dark ambience or in a distracted state.

Such a configuration is particularly useful when, for example, receptacle 1006 is positioned in console 202 between a driver and a passenger in a vehicle. Assuming that the driver occupies a seat towards surface ABFE and the passenger occupies a set towards surface DCGH, receptacle 1006B allows the user to have a view of the screen of the driver's device while charging, and receptacle 1006A allows the passenger to have a view of the screen of the passenger's device while charging.

The charge providers have been depicted on certain surfaces only for the clarity of the examples not to imply any limitation on the illustrative embodiments. From this disclosure, those of ordinary skill in the art will be able to configure a combined receptacle for a plurality of devices differently, and such other configurations are contemplated within the scope of the illustrative embodiments.

Figure 12:
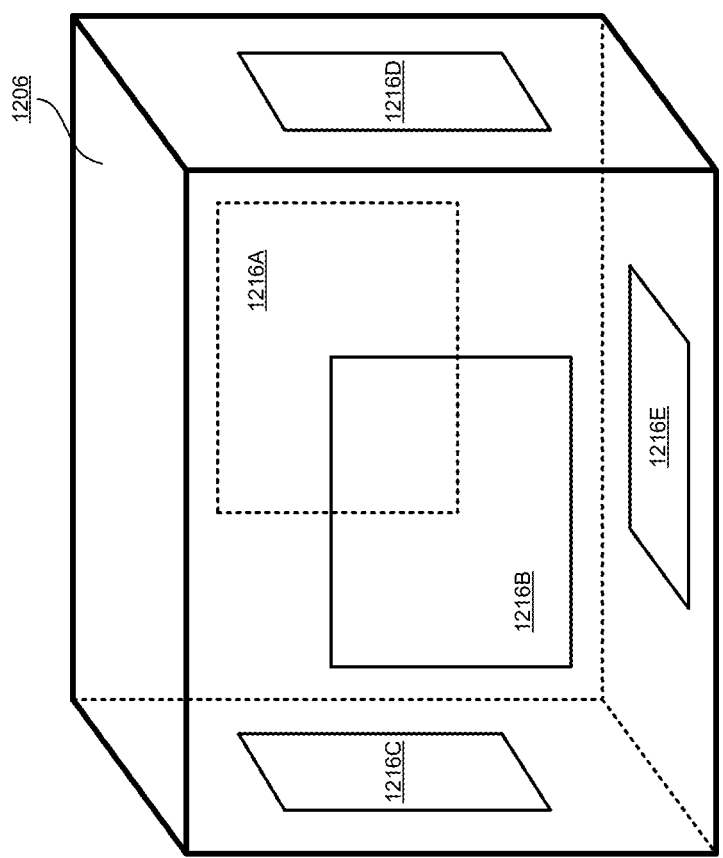
FIG. 12 depicts a block diagram of another example configuration of a wireless charging receptacle in accordance with an illustrative embodiment.

With reference to FIG. 12, this figure depicts a block diagram of another example configuration of a wireless charging receptacle in accordance with an illustrative embodiment. Receptacle 1206 is an example of any receptacle described in FIGS. 2A-11.

Receptacle 1206 is configured with a plurality of charge providers, to wit, 1216A, 1216B, 1216C, 1216D, and 1216E. Not all charge providers 1216A-E may be installed or used in a particular implementation of the depicted embodiment.

Each of the charge providers 1216A-E is located relative to a different surface of receptacle 1206. Configured in this manner, receptacle 1206 offers the flexibility of positioning a charge receiver on a device in any suitable location, yet ensuring that the device will be charged regardless of how the device is oriented in receptacle 1206. Such an embodiment is particularly useful when a receptacle has to be designed to accommodate a variety of devices, where the shapes and form factors of the devices can vary significantly.

Figure 13:
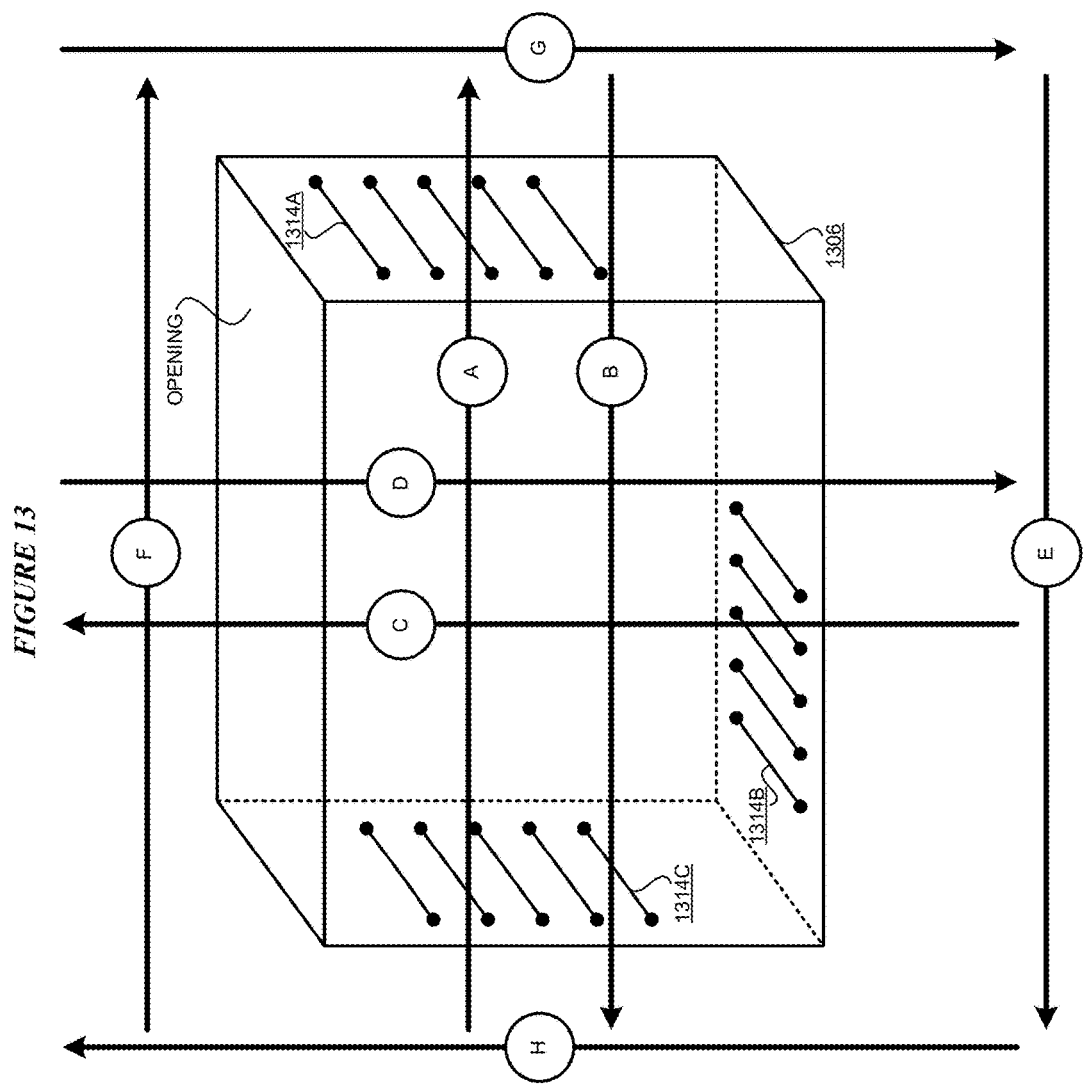
FIG. 13 depicts a block diagram of a cooling mechanism for a wireless charging receptacle in accordance with an illustrative embodiment.

With reference to FIG. 13, this figure depicts a block diagram of a cooling mechanism for a wireless charging receptacle in accordance with an illustrative embodiment. Receptacle 1306 is an example of any receptacle described in FIGS. 2A-12.

When the cooling mechanism employs ambient or refrigerated air, vents 1314A, 1314B, 1314C, or some combination thereof allow such air to flow through receptacle 1306. For example, vents 1314A and 1314C permit air flow, such as flow 210, to occur in direction A, B, or both. Alternatively, or in conjunction with flows A and B, vents 1314B and the opening on top of receptacle 1306 permit the air flow to occur in direction C, D, or both. Flows A, B, C, D, or some combination thereof help remove the heat generated due to charging in a direct cooling of the device placed in receptacle 1306.

In some implementations, flows around receptacle 1306 may substitute or augment flows A, B, C, D, or a combination thereof. For example, flows E, F, G, and H may be directed to occur outside receptacle 1306, such that the heat from receptacle 1306 is indirectly extracted via cooling of the receptacle surfaces.

With reference to FIG. 14, this figure depicts a flowchart of an example process to configure a wireless charging receptacle in accordance with an illustrative embodiment. Process 1400 can be implemented in any manufacturing process or apparatus that is suitable for manufacturing an automotive part or a charging appliance for portable devices. For example, process 1400 can be implemented as computer usable instructions to program or operate a machine to configure or produce a wireless charging receptacle according to an embodiment.

Process 1400 selects a shape of the receptacle to be formed (block 1402). The process identifies one or more sides of the shape that does not have the largest surface area among all the sides of the selected shape (block 1404).

The process creates an opening in the receptacle using the identified side such that a device can be inserted into the receptacle only from that opening (block 1406). The process orients the receptacle such that the opening is positioned on an available surface in a vehicle and the remainder of the receptacle is behind or under the surface (block 1408).

The process configures a wireless charging mechanism on at least one side of the receptacle, other than the side with the opening (block 1410). The process optionally further configures a guiding mechanism relative to the receptacle, to guide a device through the opening into a suitable position relative to the wireless charging mechanism (block 1412).

The process optionally further configures a restraining mechanism relative to the receptacle, to hold the device in the suitable position relative to the wireless charging mechanism (block 1414). The process optionally further configures a cooling mechanism relative to the receptacle, to remove the heat byproduct of charging the device as needed, and cool the device, the receptacle, another component near the receptacle, or a combination thereof, for safe and reliable operation (block 1416). The process ends thereafter.

Thus, a method is provided in the illustrative embodiments for a wireless charging receptacle. Where an embodiment or a portion thereof is described with respect to a type of device, the method or apparatus, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for forming a wireless charging receptacle apparatus, the method comprising:

forming an enclosure having a shape and a plurality of sides to at least partially enclose a device while charging a rechargeable power source in the device;

forming an opening in the enclosure, the opening enabling the enclosure to removably receive the device, wherein the opening is located on a first side from the plurality of sides, wherein the first side has a surface area less than a second surface area of a second side in the plurality of sides, the second surface area being a largest of all surface areas of all sides in the plurality of sides;

forming a cooling mechanism comprising a set of vents, wherein the cooling mechanism allows a cooling fluid to flow through the enclosure in a first direction and a second direction, and wherein the first direction is perpendicular to the second direction, wherein the set of vents includes a first vent to allow the cooling fluid to flow into the enclosure in the first direction and a second vent to allow the cooling fluid to flow out of the enclosure in the first direction, and a third vent to allow the cooling fluid to flow into the enclosure in the second direction and a fourth vent to allow the cooling fluid to flow out of the enclosure in the second direction, and wherein the set of vents are configured relative to the opening in the enclosure to allow the cooling fluid to enter and exit the enclosure through the opening;

configuring a wireless charging mechanism relative to at least one of (i) the second side and (ii) a third side of the enclosure, wherein the wireless charging mechanism wirelessly supplies energy to a second wireless charging mechanism coupled with the device;

forming a height adjustment mechanism, wherein the height adjustment mechanism holds the device in a position at a certain depth in the enclosure, wherein the position places the second wireless charging mechanism within a threshold distance from the wireless charging mechanism, wherein the height adjustment mechanism includes a first spring configured to apply a first force along a first outer surface of the device; and forming a restraining mechanism comprising a movable structure associated with a side in the plurality of sides, wherein the restraining mechanism holds the device in a position within the receptacle, wherein the position places the second wireless charging mechanism within a threshold distance from the wireless charging mechanism, wherein the movable structure includes a second spring configured to apply a second force along a second outer surface of the device to hold the device within the threshold distance from the wireless charging mechanism responsive to the device making contact with the height adjustment mechanism, the first force being perpendicular to the second force.

2. The method of claim 1, wherein the receptacle is positioned relative to a surface in a vehicle such that the first side with the opening is positioned on the surface and other sides in the plurality of sides are obscured by the surface.

3. The method of claim 2, wherein the surface is a substantially horizontal surface in the vehicle.

4. The method of claim 2, wherein the surface is a substantially vertical surface in the vehicle.

5. The method of claim 1, further comprising:
forming a guiding mechanism, wherein the guiding mechanism guides the device into a position at least partially within the receptacle, wherein the position places the second wireless charging mechanism within a threshold distance from the wireless charging mechanism.

6. The method of claim 5, wherein the guiding mechanism comprises a protrusion from a side in the plurality of sides.

* * * * *